UNITED STATES PATENT OFFICE.

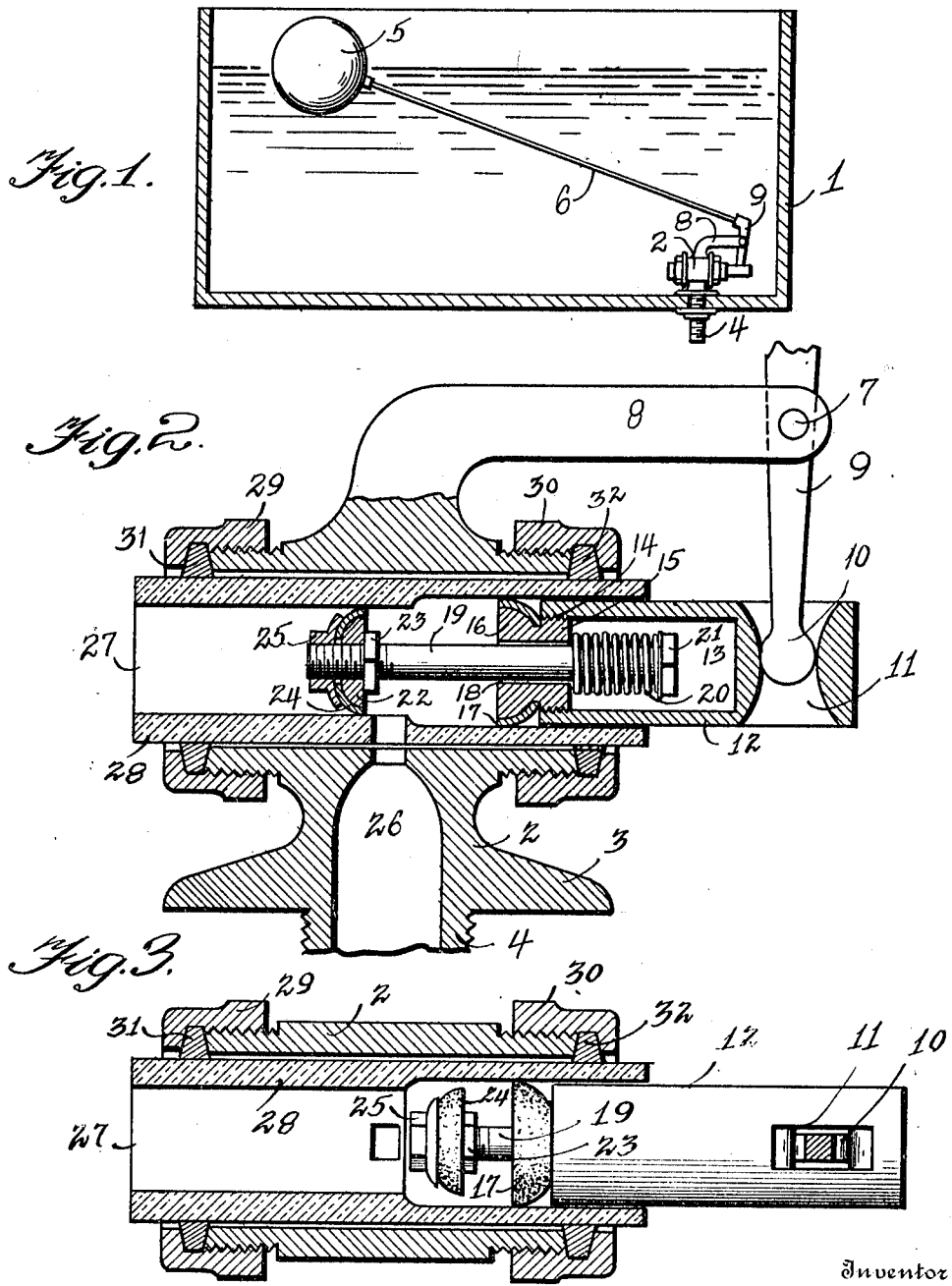

WILLIAM B. FORD, OF BIRMINGHAM, ALABAMA.

FLOAT-CONTROLLED VALVE FOR FLUSHING-TANKS AND THE LIKE.

1,313,889.   Specification of Letters Patent.   Patented Aug. 26, 1919.

Application filed April 20, 1917. Serial No. 163,483.

*To all whom it may concern:*

Be it known that I, WILLIAM B. FORD, a citizen of the United States, residing at Birmingham, in the county of Jefferson and State of Alabama, have invented certain new and useful Improvements in Float-Controlled Valves for Flushing-Tanks and the like, of which the following is a specification.

This invention relates to a float-controlled valve for flushing tanks and the like, and one of the objects of the invention is to provide a valve which is quick-acting and noiseless in closing or cutting off the supply.

It is also the object of the invention to cause the valve to quickly move to open position when the level in the tank falls below a predetermined point.

Another object is to provide a valve which will efficiently perform the service for which it is intended without the necessity of employing valve seats.

Another object of the invention is to provide a removable lining or valve tube in a casing so that when it is desirable to change the diameter of the bore for the inlet of water into the tank, it will be only necessary to substitute another tube of proper interior diameter.

Another object of the invention is to provide a valve mechanism, the parts of which may be readily assembled for application and readily disassembled for the purpose of inspection and repair.

In the drawings:—

Figure 1 is a vertical longitudinal sectional view through a flushing tank to which my invention is applied;

Fig. 2 is a longitudinal sectional view through the valve casing, the slide and its complementary part, and Fig. 3 is a horizontal sectional view through the valve casing, the retractile valve slide and valves being shown in elevation.

Referring now to the drawings by numerals of reference, 1 designates a tank of usual construction, in which is suitably secured the inlet valve casing 2. The valve casing 2 is shown as being in the form of a T-shaped body, preferably a casting provided with a flange 3 to constitute a stop to rest upon the floor of the tank 1, the threaded end 4 projecting through the floor of the tank to be connected to the supply pipe.

In carrying out my invention, I preferably employ the usual type of float here designated as 5, the float stem 6 being pivoted at 7 on a bracket 8, one end of the stem 6 being in the form of a bell crank 9 having a head 10 on its free end which engages a slot 11 in the valve slide 12. The valve slide 12 is provided with a recess 13, the inner end of which is threaded at 14 to receive the threaded end 15 of a plug 16, preferably covered by a suitable resilient material 17, and having a tendency to expand against the pressure of the water. The plug 16 is provided with a central opening 18 through which a valve stem 19 is adapted to reciprocate, the valve stem 19 being normally held in a retracted position by the spring 20, one end of which bears against the plug 16 and the other end of which bears against a nut or collar 21 on the free end of said stem. On the end of the stem opposite to the collar 21 is a sliding valve 22 which bears against a collar 23. The valve 22 is preferably covered by suitable flexible material 24 secured against the valve 22 by a concave or convex nut 25.

When the parts are in the position shown in Fig. 2, the float 5 will have assumed a normal position in the tank 1, therefore communication will be closed between the inlet 26 and the outlet 27 of the valve casing. As the water level in the tank drops, the float 5 will gradually fall so that a sliding movement will be imparted to the slide 12 carrying with it the valve stem 19 on which is the valve 22. Inasmuch as the plug 16 is of greater diameter than the valve 22, the opening movement will be quick and positive and any liability of sticking or sluggish movement will be avoided. When the valve 22 is in open position the tank will begin to fill. As the water approaches the normal level, the valve 22 will pass over the opening in the inlet 26 at relatively slow speed until the flat face of the valve 22 reaches a point slightly beyond the center of the opening 26, whereupon the water pressure will impart a quick movement to the valve 22 against the action of the spring 20 in a direction toward the stop outlet 27. As soon as the valve 22 has passed entirely beyond the inlet 26, communication between the inlet 26 and the outlet 27 will be closed and the supply of water to the tank will be shut off. Inasmuch as the valve 22 and plug 16 are of substantially different diameters, the pressure will preponderate on the plug side, but when the tank is full this pressure will be opposed by the buoyancy of the float. When, however, the water level on rising in the tank 1 reaches the float 8 the buoyancy of the float will be sufficient to overcome the pressure against the plug 16, so that a relatively slow initial sliding movement will be imparted to the slide 12 in the valve 22 from right to left until the valve 22 has passed beyond the inlet 26 sufficiently to permit the pressure of the water to be exerted against the flat face only of the valve 22, whereupon a quick closing movement will be imparted to said valve.

In practice, it has been found desirable to vary the bore in the valve casing to compensate for different water pressures. I therefore prefer to make a rough casting 2 with a removable lining or valve tube 28. This tube may be made of any desirable material, such as glass, brass or the like and it may be removably secured within the casting by cap nuts 29 and 30 and packing glands 31 and 32 the lining having a variable bore to accommodate the plug and valve respectively. With such a construction, it will only be necessary to substitute a lining, slide, plug and valve to suit the particular pressure conditions prevailing.

It will be apparent that the valve 22 may quickly cover and uncover the effective opening in the inlet 26 and effectually permit the flow or prevent the flow of water into a tank according to the needs thereof, and that the opening and closing of the valve may be accomplished without noise or other objections. It will also be observed that the parts may be readily assembled, or they may be readily taken apart whenever desirable.

I claim:—

1. The combination with a valve casing having an inlet at its side wall and an outlet at its end, of a float-actuated slide in said valve casing provided with a recess, a plug threaded in the end of said recess, a valve stem slidable through said plug and extending into the recess, a spring in the recess, one end of which bears against the plug and the other against a part on the stem and an inlet port closing valve on the free end of said stem and spaced from the plug.

2. The combination with a valve casing having an inlet at its side wall and an outlet at its end, of a float-actuated slide in said valve casing provided with a recess, a plug threaded in the end of said recess, a valve stem slidable through said plug and extending into the recess, a spring in the recess, one end of which bears against the plug and the other against a part on the stem and an inlet port closing valve on the free end of said stem and spaced from the plug, said valve being of less diameter than that of the plug.

3. A valve casing having a longitudinal bore and an inlet between one end of said bore and the outlet port, said valve comprising a head, the cross sectional area of which is coextensive with the cross sectional area of the bore, a recessed slide spaced from said valve, a stem connected to the valve and extending to the recess in said slide and a spring within the recess and providing a yielding connection between the slide and the stem.

4. A valve casing having a longitudinal bore and an inlet intermediate the ends of said bore, a slide movable in one end of said bore and comprising a body having an actuator-receiving slot, and a recess, a plug threaded in one end of the recess, a valve stem slidable through an opening in the plug, yielding connecting means between the slide and stem within the recess and a valve connected to the end of the stem distant from the recess and providing a space between the plug and said valve.

5. In a float valve mechanism, a casing, an independently removable tubular lining member in the casing, said tubular member having open ends and a float actuated valve slidably mounted within said lining.

The foregoing specification signed at Atlanta, Georgia, this 31 day of March, 1917.

WILLIAM B. FORD.